United States Patent
Hu et al.

(10) Patent No.: US 9,996,731 B2
(45) Date of Patent: *Jun. 12, 2018

(54) HUMAN HEAD DETECTION IN DEPTH IMAGES

(71) Applicant: INTEL CORPORATION, Santa Clara, CA (US)

(72) Inventors: Wei Hu, Beijing (CN); Zhixiang He, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/798,198

(22) Filed: Jul. 13, 2015

(65) Prior Publication Data

US 2015/0332466 A1 Nov. 19, 2015

Related U.S. Application Data

(63) Continuation of application No. 13/977,155, filed as application No. PCT/CN2011/001661 on Sep. 30, 2011, now Pat. No. 9,111,131.

(51) Int. Cl.
*G06K 9/00* (2006.01)
*G06K 9/62* (2006.01)
(Continued)

(52) U.S. Cl.
CPC ..... *G06K 9/00268* (2013.01); *G06K 9/00241* (2013.01); *G06K 9/00362* (2013.01);
(Continued)

(58) Field of Classification Search
CPC ......... G06T 7/0044; G06T 2207/30201; G06T 2207/30196; G06T 7/0081;
(Continued)

(56) References Cited

U.S. PATENT DOCUMENTS

2006/0291697 A1* 12/2006 Luo .................... G06K 9/00369
382/104
2009/0284627 A1 11/2009 Bando et al.
(Continued)

FOREIGN PATENT DOCUMENTS

CN 1186263 A 7/1998
CN 1202065 A 12/1998
(Continued)

OTHER PUBLICATIONS

Xia, Lu, Chia-Chih Chen, and Jake K. Aggarwal. "Human detection using depth information by kinect." Computer Vision and Pattern Recognition Workshops (CVPRW), 2011 IEEE Computer Society Conference on. IEEE, 2011.*
(Continued)

*Primary Examiner* — Chan Park
*Assistant Examiner* — Geoffrey E Summers
(74) *Attorney, Agent, or Firm* — Jordan IP Law, LLC

(57) ABSTRACT

Systems, devices and methods are described including receiving a depth image and applying a template to pixels of the depth image to determine a location of a human head in the depth image. The template includes a circular shaped region and a first annular shaped region surrounding the circular shaped region. The circular shaped region specifies a first range of depth values. The first annular shaped region specifies a second range of depth values that are larger than depth values of the first range of depth values.

22 Claims, 6 Drawing Sheets

(51) Int. Cl.
G06T 7/73 (2017.01)
G06T 7/11 (2017.01)
G06T 7/194 (2017.01)

(52) U.S. Cl.
CPC ......... G06K 9/6202 (2013.01); G06K 9/6203 (2013.01); G06T 7/11 (2017.01); G06T 7/194 (2017.01); G06T 7/74 (2017.01); G06K 9/00201 (2013.01); *G06T 2207/10028* (2013.01); *G06T 2207/20076* (2013.01); *G06T 2207/30196* (2013.01)

(58) Field of Classification Search
CPC . G06T 2207/20076; G06T 2207/20144; G06T 7/11; G06T 7/74; G06T 7/194; G06K 9/00228; G06K 9/00241; G06K 9/6203; G06K 9/00201; G06K 9/00268; G06K 9/00362; G06K 9/6202
USPC .................................. 382/209, 217, 103, 154
See application file for complete search history.

(56) References Cited

U.S. PATENT DOCUMENTS

2011/0080475 A1    4/2011  Lee et al.
2011/0211754 A1    9/2011  Litvak et al.

FOREIGN PATENT DOCUMENTS

| | | |
|---|---|---|
| CN | 2006185166 A | 7/2006 |
| CN | 2006236184 A | 9/2006 |
| CN | 101866484 A | 10/2010 |
| JP | 10214338 | 8/1998 |
| JP | 2001012922 A | 1/2001 |
| JP | 2003196656 A | 7/2003 |
| JP | 2004264738 A | 9/2004 |
| WO | 2011033673 A1 | 3/2011 |
| WO | 2013044418 A1 | 4/2013 |

OTHER PUBLICATIONS

Gonzalez Rafael, C., and E. Woods Richard. Digital Image Processing. 3rd ed. Prentice-Hall, 2007. 869-872. Print.*
Zhu, Youding, Behzad Dariush, and Kikuo Fujimura. "Controlled human pose estimation from depth image streams." Computer Vision and Pattern Recognition Workshops, 2008. CVPRW'08. IEEE Computer Society Conference on. IEEE, 2008.*
Van Oosterhout, Tim, Sander Bakkes, and Ben JA Kröse. "Head Detection in Stereo Data for People Counting and Segmentation." VISAPP. 2011.*
Mikić, Ivana, et al. "Human body model acquisition and tracking using voxel data." International Journal of Computer Vision 53.3 (2003): 199-223.*
Cheng, Shinko Y. "Real-Time Partial Body Modelling From Voxel Data." 2008.*
Cheng, Shinko Y., and Mohan M. Trivedi. "Human posture estimation using voxel data for "smart" airbag systems: issues and framework." Intelligent Vehicles Symposium, 2004 IEEE. IEEE, 2004.*
Notice of Preliminary Rejection for Euroean Patent Application No. EP 11873311, dated Apr. 7, 2016, 11 pages.
Van Oosterhout, Tim, "Head Detection in Stereo Data for People Counting and Segmentation", VISAPP 2011, Mar. 5, 2011, pp. 1-6.
Mikic, et al., "Human Body Model Acquisition and Motion Capture Using Voxel Data", Correct System Design, Jan. 1, 2002, vol. 2492, pp. 104-118.
Satake, et al., "Robust Stereo-Based Person Detection and Tracking for a Person Following Robot", Proceedings of the IEEE ICRA 2009 Workshop on People Detection and Tracking Kobe, Jan. 1, 2009, 6 pages.
Notice of Preliminary Rejection for Korean Patent Application No. 10-2014-7007442, dated Mar. 10, 2016, 7 pages.
Lu Xia, et al. "Human Detection Using Depth Information by Kinect", IEEE Computer Society Conference on CVPRW 2011, Jun. 20-25, 2011, pp. 15-22.
Youding Zhu, et al. "Controlled human pose estimation from depth image streams", IEEE Computer Society Conference on CVPRW 2008, Jun. 23-28, 2008, pp. 1-8.
First Office Action for CN201180073778.X, dated Jun. 27, 2016, 13 pages.
Last Preliminary Rejection for Korean Patent Application No. 10-2014-7007442, dated Sep. 29, 2016, 6 pages.
Office Action for Chinese Patent Application No. 201180073778.X, dated May 31, 2017, 17 pages including 10 pages of English translation.
"Calculating Simple Volumes", The UBC Calculus Online Homepage. The University of British Columbia, Mathematics Department, Apr. 14, 2009, Web. 31, Dec. 2014.
International Search Report and Written Opinion for PCT Patent Application No. PCT/CN2011/001661, dated May 3, 2012, 12 pages.
Office Action dated for CN Patent Application No. 201180073778.X dated Dec. 27, 2016, 10 pages.
Office Action for JP Patent Application No. 2014-532201, dated Feb. 10, 2015, (3 pages) including 2 pages of English translation.
Fengjun et al: "Face detection based on skin color and Template Matching", 2000, 7 pages.
Plagemann et al.: "Real-time Identification and Localization of Body Parts from Depth Images", 2010, 6 pages.
Rosenfeld et al.: "Sequential Operations in Digital Picture Processing", Journal of the Association for Computing Machinery, vol. 13, No. 4, 1966, pp. 471-494.
Shotton et al.: "Real-time Human Pose Recognition in Parts from Single Depth Images", Computer Vision and Pattern Recognition (CVPR), 2011 IEEE Conference, Jun. 2011, pp. 1297-1304.
Siddiqui et al.: "Human Pose Estimation from a Single View Point, Real-Time Range Sensor", Computer Vision and Pattern Recognitiion Workshops (CVPRW), 2010 IEEE Computer Society Conference, 2010, 8 pages.
International Preliminary Report on Patentability and Written Opinion received for PCT Patent Application No. PCT/CN2011/001661, dated Apr. 1, 2014, 6 pages.
Non Final Office Action issued in U.S. Appl. No. 13/977,155 dated Jan. 9, 2015.
Krishnamurthy et al.: "Human Detection and Extraction using Kinect Depth Images. "Bournemouth University (2011).
Notice of Allowance issued in U.S. Appl. No. 13/977,155 dated Apr. 28, 2015.
Supplemental Notice of Allowability issued in U.S. Appl. No. 13/977,155 dated Jun. 1, 2015.
Supplemental Notice of Allowability issued in U.S. Appl. No. 13/977,155 dated Jun. 11, 2015.
Office Action for CN Patent Application No. 201180073778.X dated Mar. 13, 2018, 10 pages including 5 pages of English translation.

* cited by examiner

HUMAN HEAD DETECTION IN DEPTH IMAGES

BACKGROUND

Depth imaging technology has advanced dramatically over the last few years. Pixels in a depth image indicate calibrated depth in the scene, rather than a measure of intensity or color. Depth images may allow for more accurate detection of objects such as human beings. Further, detection or localization of a human head may aid the detection of other human body parts in an image such as shoulders, torso, arms and legs, and so forth.

Most of the current approaches to human head location, like color-based methods and face detector based methods, utilize either color or grayscale intensity information. Moreover, face detection techniques are of no avail when the subject is not facing the camera. While, skin color detection techniques may be useful for locating other parts of the body, such techniques have difficulty adapting to varying illumination. Recent attempts at human body part detection based only on depth information are problematic when a subject's hands are closed and/or when the subject's head is partially or fully occluded by another body part (e.g., as may occur when a subject is bending forward). In addition, to train object detectors, conventional depth-based techniques tend to require detailed 3D human pose images that are difficult to acquire.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
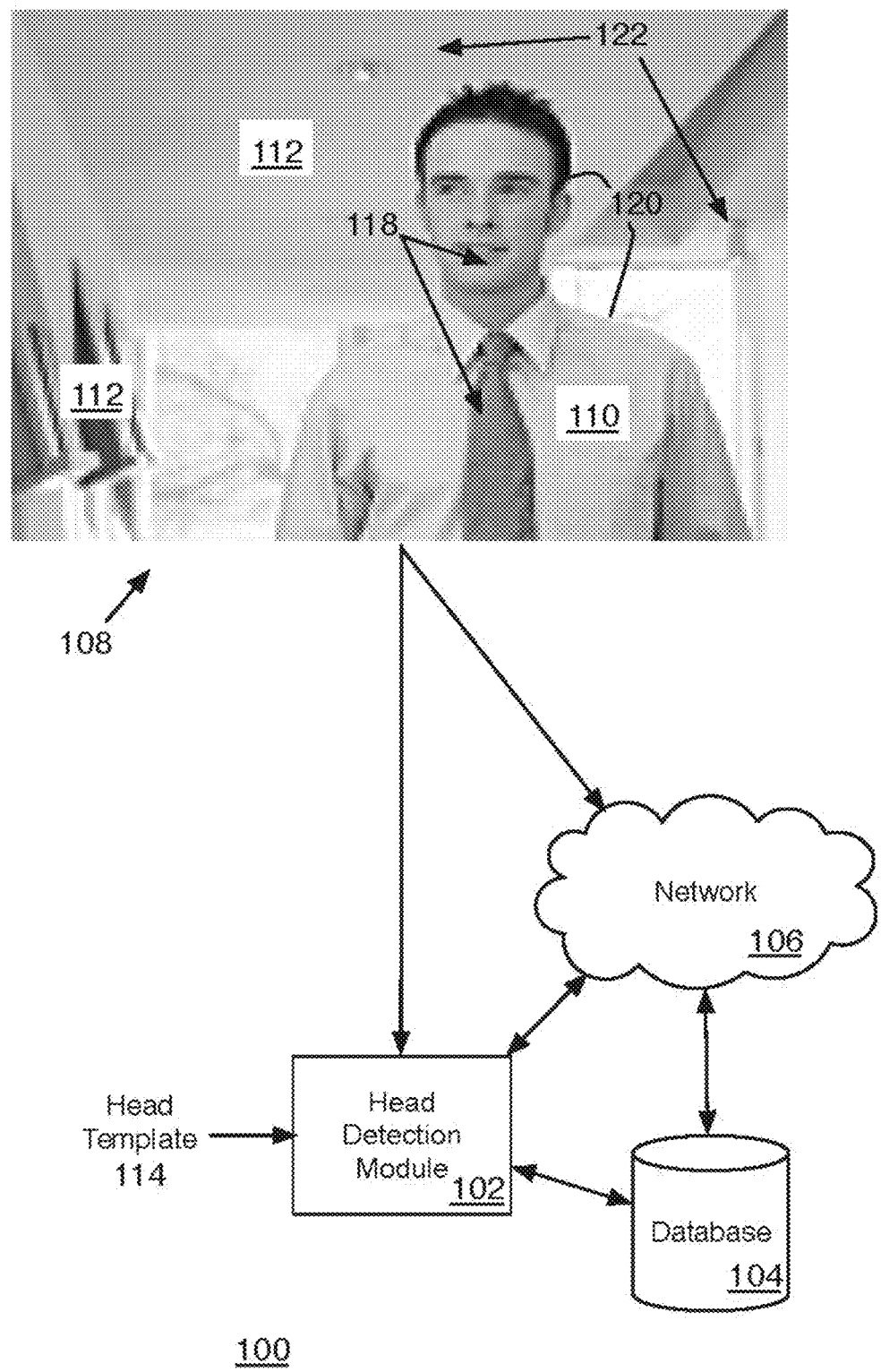
FIG. 1 is an illustrative diagrams of an example head detection system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM) random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example system 100 in accordance with the present disclosure. In various implementations, system 100 may include a head detection module 102, a database 104, and a network 106. As will be explained in greater detail below, detection module (HDM) 102 may receive a depth image 108 that includes a foreground portion 110 (e.g., in the form of an image of a human being) and background portion 112. In various implementations, depth image 108 may have been preprocessed using various well-known techniques (see, e.g., Azriel Rosenfeld and John L. Pfaltz, "Sequential Operations in Digital Picture Processing, "*J. ACM*, vol. 13, no. 4, pp. 471-494, October 1966) to segment image 108 into foreground portion 110 and background portion 112 and/or to identify foreground portion 110 as the image of a human body.

In various implementations, HDM 102 may receive depth image 108 and a head template 114. HDM 102 may then apply head detection processes to be described in greater detail below to detect and locate a human head in depth image 108 using template 114. In various implementations, HDM 102 may receive depth image 108 directly, may receive depth image 108 via network 106, and/or may receive depth image 108 from database 104 either directly or via network 106. Similar possibilities apply to the reception of the head template. In various implementations, HDM 102 may provide results of the head detection processes including the pixel location within the depth image corresponding to the center of a detected head and the detected head's radius value to be stored in database 104 either directly or via network 106.

In various implementations, depth image 108 may be a monochrome or color depth image including pixels specifying chrominance and/or luminance intensity data values and depth data values. For example, depth image may include a two-dimensional (2D) array of image intensity values (e.g., luminance values) at image pixel positions (x,y) with each pixel position also including a depth (z) value. Further, depth image 108 may have any resolution and/or aspect ratio. The present disclosure is not limited to any particular data format, image resolution, image aspect ratio and so forth associated with depth image 108. In addition, network 106 may be any type of network and may include any combination of wireless and/or wired network technology. For instance, in a non-limiting example, network 106 may include one or more wireless local area networks (LANs) in combination with a wide area network (WAN), such as the internet.

HDM 102 may be provided by any computing system. For example, HDM 102 may be provided by a computing system that also captured depth image 108. In other implementations, HDM 102 may be remote to any device that captured image 108. For example, one or more processor cores of a remote server computing system may provide HDM 102. Further, any type of logic including hardware, software and/or firmware logic or any combination thereof may provide HDM 102.

Figure 2:
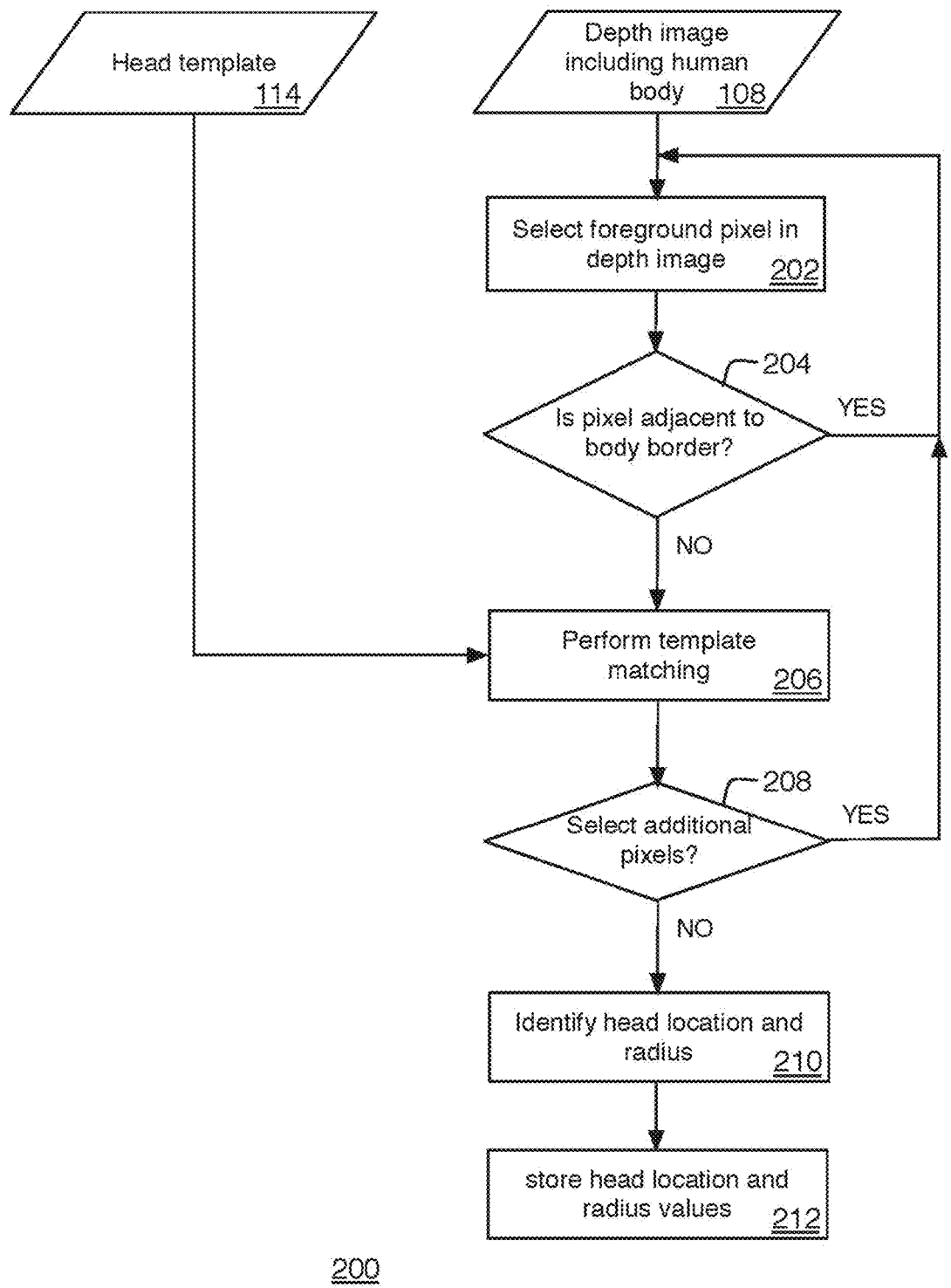
FIG. 2 is a flow chart of an example head detection process.

FIG. 2 illustrates a flow diagram of an example process 200 for detecting a head in a depth image according to various implementations of the present disclosure. Process 200 may include one or more operations, functions or actions as illustrated by one or more of blocks 202, 204, 206, 208, 210 and 212 of FIG. 2. By way of non-limiting example, process 200 will be described herein with reference to example system 100 of FIG. 1.

Process 200 may begin at block 202 where a foreground pixel in depth image 108 may be selected. For example, referring to FIG. 1, depth image 108 of block 202 may have been preprocessed using well-known techniques to specify the depth image's pixels as belonging to either background portion 112 or foreground portion 110. In addition, the preprocessing may have identified portion 110 as a human body. Block 202 may thus include selecting a pixel from foreground portion 110.

At block 204, a determination may be made as to whether the foreground pixel selected at block 202 is adjacent to a body border. For example, in FIG. 1, pixels 118 residing within body boundary 120 are specified as foreground pixels while pixels 122 residing outside body boundary 120 are specified as background pixels. Block 204 may then involve determining if the selected foreground pixel is near by or next to a body border. In various non-limiting implementations, a foreground pixel selected at block 202 may be designated as not being adjacent to a body border if there are two or more pixels in either the horizontal or vertical directions separating the selected pixel from a body border.

If block 204 results in a determination that the pixel selected at block 202 is adjacent to a body border, then process 200 may loop back to block 202 and a next foreground pixel may be selected and another iteration of block 204 may be undertaken with that pixel. If, however, block 204 results in a determination that the pixel selected at block 202 is not adjacent to a body border, then process 200 may continue at block 206 where head template 114 may be applied to the selected foreground pixel to perform template matching.

In various implementations, the head template 114 applied at block 206 may include an array of points having a pitch and orientation that matches the pitch of depth image 108's pixel array so that each point in the template corresponds to one pixel location in the depth image. In other implementations, the pitch of head template 114 may be an integer multiple of the pitch of the depth image. In addition, head template may have any size and or shape.

Figure 3:
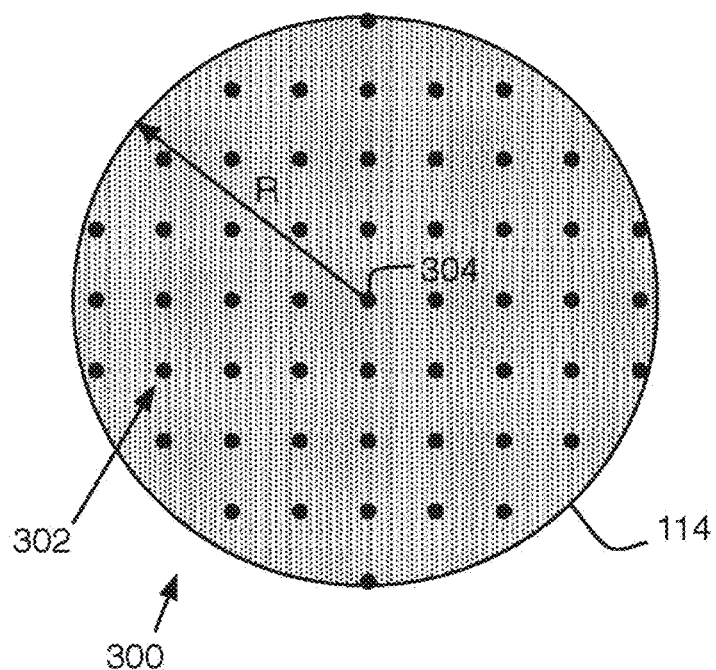
FIGS. 3 and 5 illustrate an example head detection template.

Further, the size of head template may adapt as head template 114 is applied to depth image 108. For instance, while in the non-limiting example implementations that follow, head template 114 may be described as circular shaped array of diameter haring an initial diameter sufficient to span nine pixel locations in depth image 108 and having a total of fifty-three points, when applied to image 108, head template 114 may be varied in diameter such that it may span any number of pixels. FIG. 3 illustrates an overall shape 300 of an example head template 114 according to various implementations of the present disclosure. In this example, template 114 is circular in shape and has an initial radius R such that it includes an array of fifty-three points 302 (including a center point 304), where array 302 has a same pitch and orientation as the pixel array of image 108.

Figure 4:
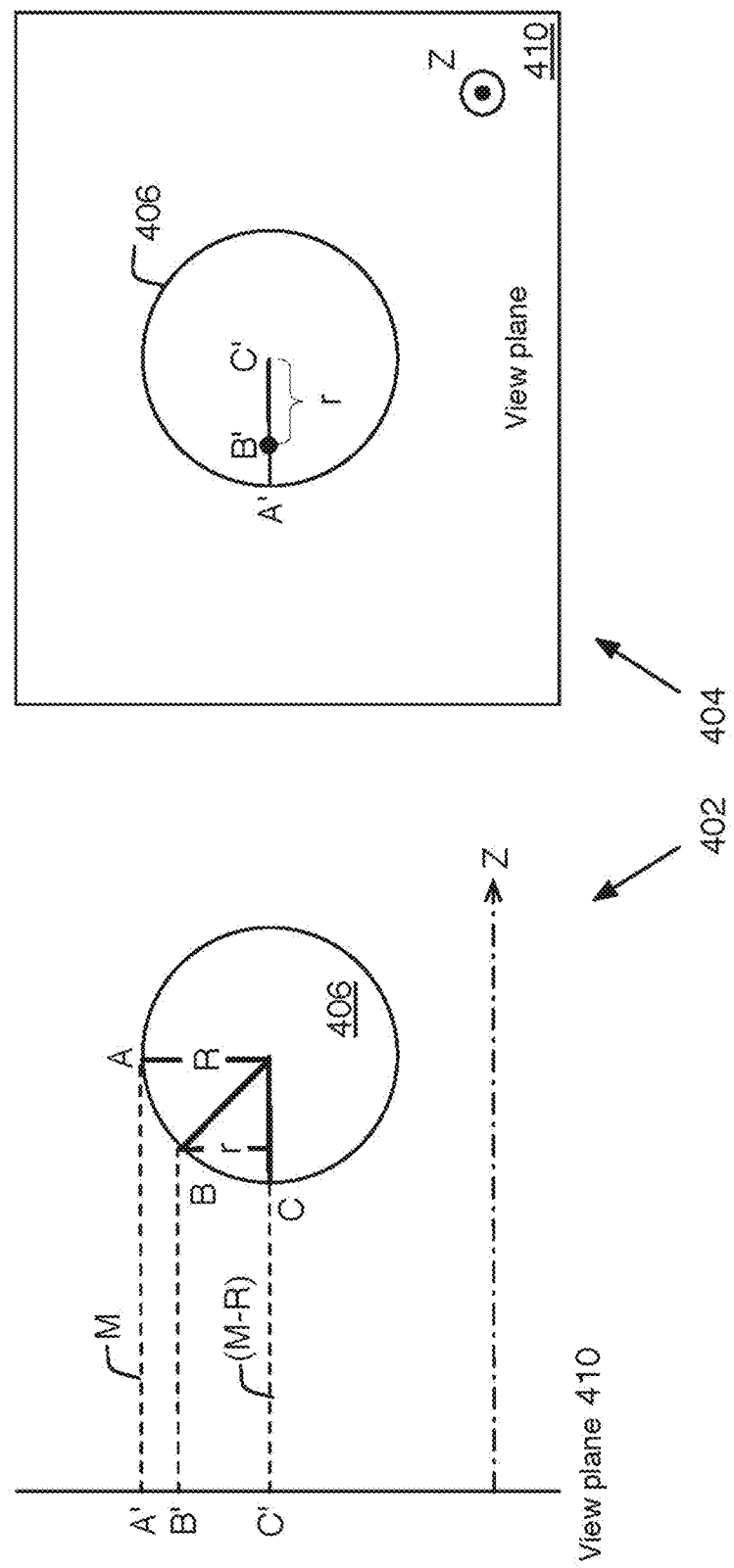
FIG. 4 is an illustrative diagram of an example head detection model.

In various implementations, head template 114 may be created in reference to a projection model. For instance, FIG. 4 illustrates a reference projection model 400 according to various implementations of the present disclosure. FIG. 4 shows two views 402 and 404 of model 400. In view 402, a spherical object 406 having a radius R and modeling a human head appears viewed side-on with respect to a view plane 408 representing, for instance, an image plane of depth image 108. In view 404, object 406 is shown from the perspective of the view plane 410. In both views 402 and 404, an ordinate Z (orthogonal to view plane 410) represents increasing depth or distance away from view plane 410.

FIG. 4 depicts several points A, B, and C on the surface of object 406 and corresponding projections of those points A', B', and C' on view plane 410. Point C represents a closest point on object 406 with respect to view plane 410, point A represents a furthest visible point, and point B represents a location having an intermediate depth or distance between point A and point C. The distance between the projection points B' and C' is denoted by r. Assuming that the distance AA' is M, then the distance CC' is M-R, and a depth value associated with B' may be calculated using the following formula:

$$B'_{depth} = \frac{\sqrt{R^2 - r^2}}{R}. \tag{1}$$

Using Eqn. (1), the depth of any point on the surface of the sphere that projects onto view plane 410 of a depth image, and hence the depth value associated with the projection of that point on the depth image view plane, may be determined.

However, it may be recognized that, in general, the center portion of a human head in a depth image will be closer to the image view plane, marginal portions of the head will be somewhat further away from the view plane, and that background portions of the image (e.g., non-head body parts, background objects, and so forth) will be yet further away from the view plane. With this in mind, a head template in accordance with various implementations may be specified to include three concentric regions having different depth values associated with each circle.

Figure 5:
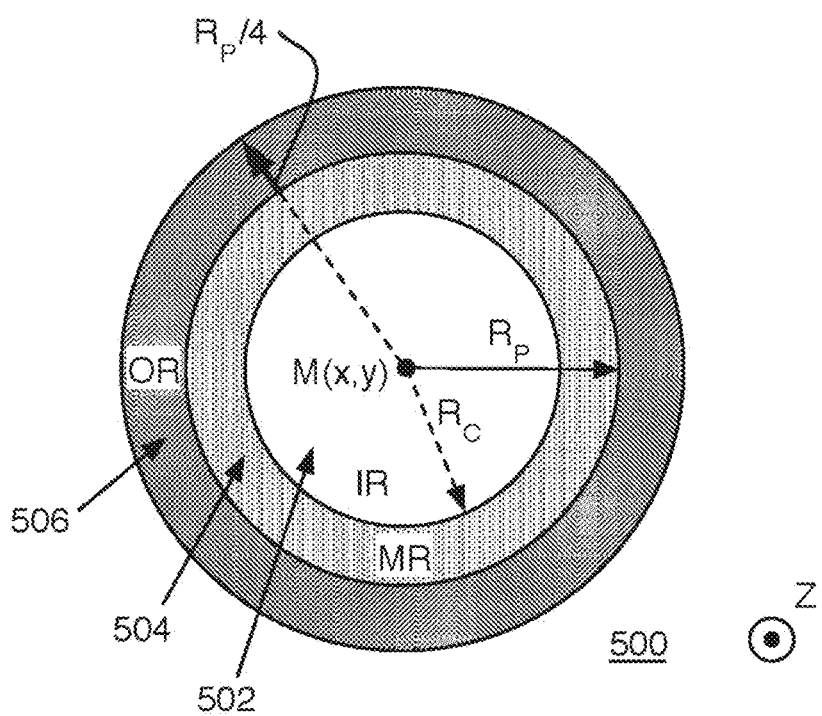

For instance, in various implementations, the structure of head template 207 may be specified as a set of a three concentric circular an/or annular shaped regions. FIG. 5 illustrates a head template model 500 viewed from the perspective of a depth image plane according to various implementations of the present disclosure. For example, head template 114 may be based on head template model 500. As shown in FIG. 5, head template model 500 includes three regions: a circular inner region (IR) 502, an annular shaped middle region (MR) 504, and an annular shaped outer region (OR) 506.

In general a human head may have a radius $R_H$ ranging from 80 mm to 150 mm. The projection of the head's radius in the image view plane may be denoted Rp. In model 500, inner region IR represents the center of the head and has a radius of $Rc = (4/5) \cdot Rp$, the annular shaped middle region MR represents the margin region of the head, and the annular shaped outer region OR represents a region adjacent to the head and has a radius of $(5/4) \cdot Rp$. Expressed another way, region MR may have a radius that is 1.25 times larger than the radius of region IR, and, in turn, region OR may have a radius that is 1.25 times larger than the radius of region MR.

With M(x,y) representing the center of the model. M(i,j) represents a point on the model whose distance to M(x,y) may be provided by $d = \sqrt{(i-x)^2 + (j-y)^2}$. The following formulae may be used to determine the depth values of any point M(i,j) within the different regions IR, MR and OR:

for $M(i, j) \in IR$: (2)

$$\left\{ \frac{\sum_{d \leq R_c} \sqrt{R_P^2 - d^2} / R_P}{Num(IR) \cdot} \middle/ \left( \sum_{d \leq R_c} \left( \sqrt{R_P^2 - d^2} / R_P \right) + \sum_{R_c < d \leq R_P} \left( \sqrt{R_P^2 - d^2} / R_P \right) \right) \right.$$

for $M(i, j) \in MR$: (3)

$$\left\{ \frac{\sum_{R_c < d \leq R_P} \left( \sqrt{R_P^2 - d^2} / R_P \right)}{Num(MR) \cdot} \middle/ \left( \sum_{d \leq R_c} \left( \sqrt{R_P^2 - d^2} / R_P \right) + \sum_{R_c < d \leq R_P} \left( \sqrt{R_P^2 - d^2} / R_P \right) \right) \right.$$

for $M(i, j) \in OR$: $\frac{-1}{Num(OR)}$ (4)

where Num(X) represents the total number of template points within the corresponding region X.

Continuing the discussion of block 206, template matching may include applying a head template to the selected foreground pixel by centering the template on the selected pixel location (e.g., corresponding to point M(x,y) in the template model) and then comparing the depth values of pixels neighboring the selected pixel to the template depth values in the different regions IR (502), MR (504) and OR (506) as determined using Eqns. (2), (3) and (4), respectively.

Figure 6:
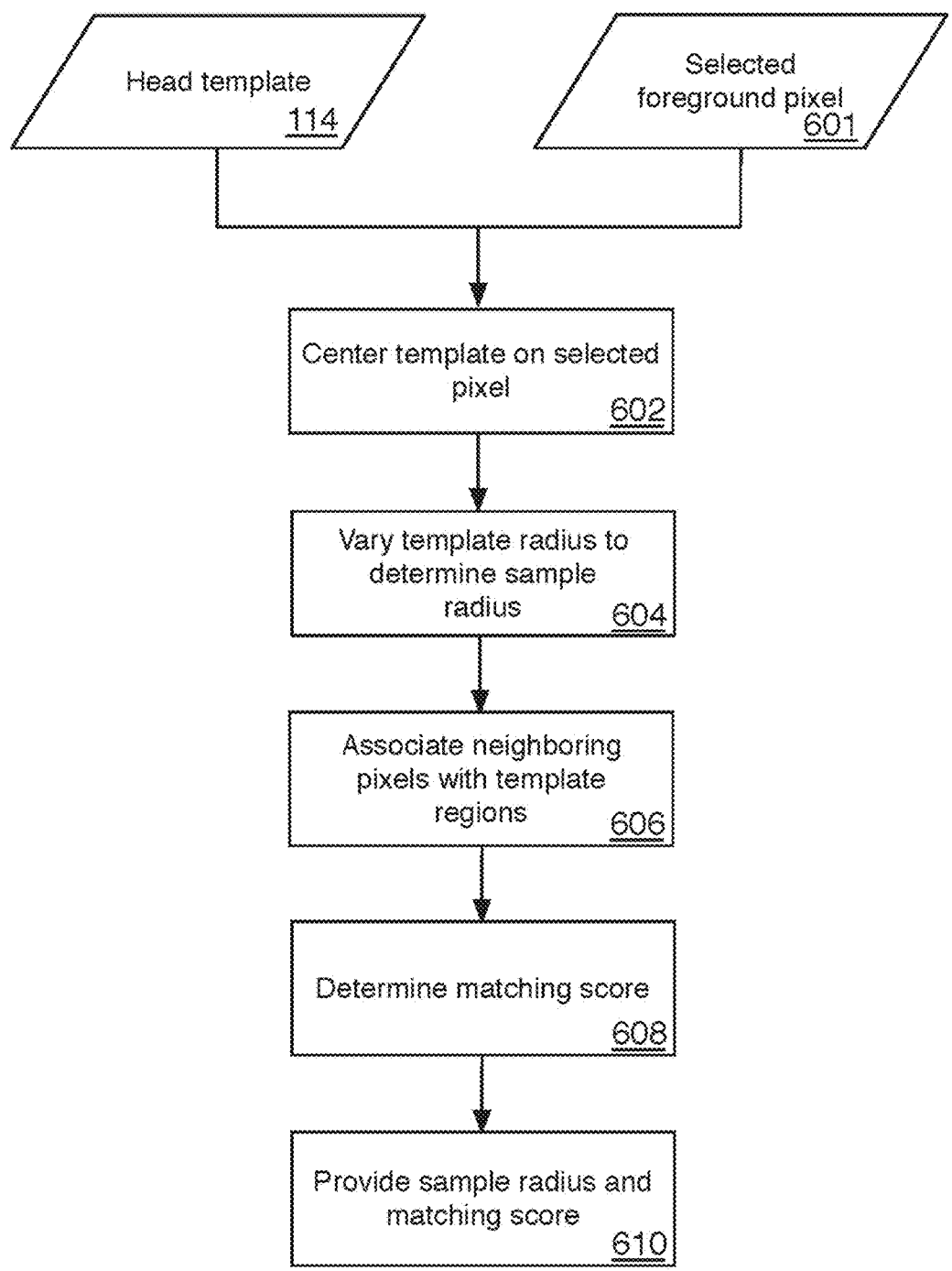
FIG. 6 is a flow chart of an example head detection process.

FIG. 6 illustrates a flow diagram 600 of block 206 of process 200 in greater detail according to various implementations of the present disclosure. Process 600 may include one or more operations, functions or actions as illustrated by one or more of blocks 602, 604, 606, 608 and 610 of FIG. 6.

Process 600 may begin at block 602 where head template 114 may be centered on the selected foreground pixel 601. At block 604 the template radius may be varied from a minimum value (minR) to a maximum value (maxR) in predetermined step sizes for the foreground pixel 601 (denoted I(i,j) below) to determine a sample radius $R_P$ using the following formulas:

$$d = \sqrt{(i-x)^2 + (j-y)^2} \tag{5}$$

$$th_{inner} = \frac{\left( \sum_{d \leq R_c} I(i, j) \right)}{Num(IR)}$$

$$th_{mid} = \frac{\left( \sum_{R_c < d \leq R_P} I(i, j) \right)}{Num(MR)}$$

$$th = \frac{(th_{inner} \cdot Num(IR) + th_{mid} \cdot Num(MR))}{(Num(IR) + Num(MR))}$$

where values of the thresholds $th_{inner}$, $th_{mid}$ and th determine the sample radius.

With a sample radius determined at block 604, process 600 may continue at block 606 where pixels neighboring the selected foreground pixel (corresponding to pixels $\{I(i,j) | \sqrt{(i-x)+(j-y)} \leq R_p + R_p/4\}$) may be associated with or divided among the different template regions. In various implementations, block 606 may be undertaken using the following equations:

$IR_p = \{I(i,j) | d \leq R_c \& I(i,j) > th_{inner}\}$ $MR_p = \{I(i,j) | R_c < d \leq R_p \& I(i,j) \geq th\}$ $OR_p = \{I(i,j) | R_p < d \leq (R_p + R_p/4) \& I(i,j) \geq th\}$ (6)

At block 608, a matching score may be determined based on the template depth values associated with the different regions and the depth values of the selected foreground pixel pixels and the neighboring pixels as associated with the regions using Eqns. (6). In various implementations, block 608 may be undertaken using the following equations:

$$H(x, y) = \left( \sum_{I(i,j) \in IR_p} I(i, j) \cdot depth(M(x, y)) + \sum_{I(i,j) \in MR_p} I(i, j) \cdot depth(M(x, y)) + \sum_{I(i,j) \in OR_p} I(i, j) \cdot depth(M(x, y)) \right) \bigg/ SUM \tag{7}$$

where $SUM = \Sigma_{I(i,j) \in IR_p} I(i,j) + \Sigma_{I(i,j) \in MR_p} I(i,j) + \Sigma_{I(i,j) \in OR_p} I(i,j)$ (8)

Process 600 may then conclude at block 610 where a matching score (H(x,y)) and a sample template radius (Rp) may be provided for the selected foreground pixel 601.

Returning to the discussion of FIG. 2, having performed template matching at block 206, process 200 may continue at block 208 with a determination of whether to select additional foreground pixels for processing. For example, process 200 may be undertaken for all foreground pixels in depth image 108. Thus, if additional foreground pixels remain for processing, then block 208 may result in a positive determination and process 200 may loop back to undertake blocks 202-206 for another foreground pixel.

If, however, block 208 results in a negative determination, process 200 may continue to block 210 where a head location and radius may be identified. In various implementations, block 210 may include comparing all the matching scores (H(x,y)) determined for every foreground pixel processed at block 206 and identifying a highest or best matched score having form $$H = \max_{(x,y) \in I, R_p \in [min\ R, max\ R]}(H(x,y)) \tag{9}$$

The center of the detected head's location may then correspond to the location of the foreground pixel having the highest or best matched score, and the associated radius $R_p$ may correspond to the detected head's radius.

Process 200 may then conclude at block 212 where values of the head location and radius may be stored. For example, having undertaken blocks 202-210, head detection module 102 may then store the head location and radius values in database 104.

In various implementations, process 200 may be performed on a series of foreground pixels by scanning the template across the foreground portions of a depth image. In some implementations, such scanning may include scanning each foreground pixel of an image. In other implementations, such scanning may be undertaken using a sparse grid approach in which only some foreground pixels are processed. For instance, in various non-limiting examples, only every other foreground pixel, every fifth foreground pixel, every tenth foreground pixel, and so forth may be sampled or processed using process 200.

While implementation of example processes 200 and 600, as illustrated in FIGS. 2 and 6, may include the undertaking of all blocks shown in the order illustrated, the present disclosure is not limited in this regard and, in various examples, implementation of processes 200 and 600 may include the undertaking only a subset of all blocks shown and/or in a different order than illustrated.

In addition, any one or more of the processes and/or blocks of FIGS. 2 and 6 may be undertaken in response to instructions provided by one or more computer program products. Such program products may include signal bearing media providing instructions that, when executed by, for example, one or more processor cores, may provide the functionality described herein. The computer program products may be provided in any form of computer readable medium. Thus, for example, a processor including one or more processor core(s) may undertake one or more of the blocks shown in FIGS. 2 and 6 in response to instructions conveyed to the processor by a computer readable medium.

Figure 7:
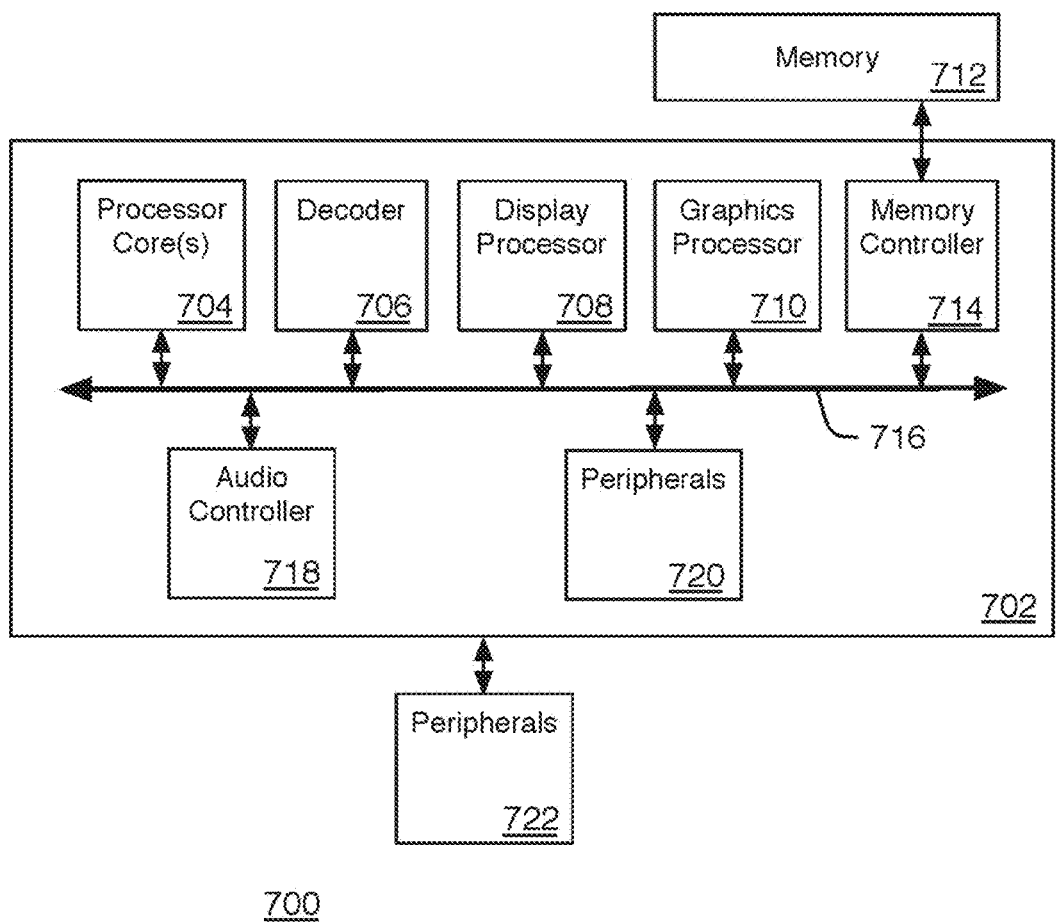
FIG. 7 is an illustrative diagram of an example system, all arranged in accordance with at least some implementations of the present disclosure.

FIG. 7 illustrates an example system 700 in accordance with the present disclosure. System 700 may be used to perform some or all of the various functions discussed herein and may include any device or collection of devices capable of undertaking processes described herein in accordance with various implementations of the present disclosure. For example, system 700 may include selected components of a computing platform or device such as a desktop, mobile or tablet computer, a smart phone, a set top box, etc., although the present disclosure is not limited in this regard. In some implementations, system 700 may be a computing platform or SoC based on Intel® architecture (IA) for CE devices. It will be readily appreciated by one of skill in the art that the implementations described herein can be used with alternative processing systems without departure from the scope of the present disclosure.

System 700 includes a processor 702 having one or more processor cores 704. Processor cores 704 may be any type of processor logic capable at least in part of executing software and/or processing data signals. In various examples, processor cores 704 may include CISC processor cores, RISC microprocessor cores, VLIW microprocessor cores, and/or any number of processor cores implementing any combination of instruction sets, or any other processor devices, such as a digital signal processor or microcontroller.

Processor 702 also includes a decoder 706 that may be used for decoding instructions received by, e.g., a display processor 708 and/or a graphics processor 710, into control signals and/or microcode entry points. While illustrated in system 700 as components distinct from core(s) 704, those of skill in the art may recognize that one or more of core(s) 704 may implement decoder 706, display processor 708 and/or graphics processor 710. In some implementations, processor 702 may be configured to undertake any of the processes described herein including the example processes described with respect to FIGS. 2 and 6. Further, in response to control signals and/or microcode entry points, decoder 706, display processor 708 and/or graphics processor 710 may perform corresponding operations.

Processing core(s) 704, decoder 706, display processor 708 and/or graphics processor 710 may be communicatively and/or operably coupled through a system interconnect 716 with each other and/or with various other system devices, which may include but are not limited to, for example, a memory controller 714, an audio controller 718 and/or peripherals 720. Peripherals 720 may include, for example, a unified serial bus (USB) host port, a Peripheral Component Interconnect (PCI) Express port, a Serial Peripheral Interface (SPI) interface, an expansion bus, and/or other peripherals. While FIG. 7 illustrates memory controller 714 as being coupled to decoder 706 and the processors 708 and 710 by interconnect 716, in various implementations, memory controller 714 may be directly coupled to decoder 706, display processor 708 and/or graphics processor 710.

In some implementations, system 700 may communicate with various I/O devices not shown in FIG. 7 via an I/O bus (also not shown). Such I/O devices may include but are not limited to, for example, a universal asynchronous receiver/transmitter (UART) device, a USB device, an I/O expansion interface or other I/O devices. In various implementations, system 700 may represent at least portions of a system for undertaking mobile, network and/or wireless communications.

System 900 may further include memory 712. Memory 712 may be one or more discrete memory components such as a dynamic random access memory (DRAM) device, a static random access memory (SRAM) device, flash memory device, or other memory devices. While FIG. 7 illustrates memory 712 as being external to processor 702, in various implementations, memory 712 may be internal to processor 702. Memory 712 may store instructions and/or data represented by data signals that may be executed by processor 702 in undertaking any of the processes described herein including the example process described with respect to FIGS. 2 and 6. For example, memory 712 may store head template depth values, detected head location and radius values and so forth. In some implementations, memory 712 may include a system memory portion and a display memory portion.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A method for detecting a human head in an image, comprising:
    receiving a depth image; and
    applying a template to pixels of the depth image to determine a location of a human head in the depth image, wherein the template includes a circular shaped region and a first annular shaped region surrounding the circular shaped region, the circular shaped region specifying a range of a first plurality of depth values, the first annular shaped region specifying a range of a second plurality of depth values, the second plurality of depth values including depth values larger than the first plurality of depth values, wherein the template specifies a second annular shaped region entirely surrounding the first annular shaped region, the second annular shaped region specifying a third plurality of depth values all having the same depth value,
    wherein applying the template to pixels of the depth image comprises matching the template to a plurality of foreground pixels in the depth image by comparing depth values of the template to depth values of a neighboring group of pixels surrounding an individual foreground pixel, for the plurality of foreground pixels.

2. The method of claim 1, wherein the first plurality of depth values are based at least in part on a first depth determining model, wherein the second plurality of depth values are based at least in part on a second depth determining model different from the first depth determining model, wherein the third plurality of depth values are based at least in part on a third depth determining model different from the first and second depth determining models, and the third plurality of depth values including depth values larger than the second plurality of depth values.

3. The method of claim 2, wherein the first plurality of depth values are associated only with points in the template lying within the circular shaped region, wherein the second plurality of depth values are associated only with points in the template lying within the first annular shaped region, and wherein the third plurality of depth values are associated only with points in the template lying within the second annular shaped region.

4. The method of claim 2, wherein a radius of the first annular shaped region has a value of 1.25 times a radius of the circular shaped region, and wherein a radius of the second annular shaped region has a value of 1.25 times the value of the radius of the first annular shaped region.

5. The method of claim 1, wherein comparing depth values of the template to depth values of the neighboring group of pixels comprises:
    associating a first group of neighboring pixels of the foreground pixel with the circular shaped region, and associating a second group of neighboring pixels of the foreground pixel with the first annular shaped region;
    comparing depth values of the first group of neighboring pixels to depth values of the circular shaped region; and
    comparing depth values of the second group of neighboring pixels to depth values of the first annular shaped region.

6. The method of claim 1, wherein determining the location of the human head in the depth image comprises determining a foreground pixel of the depth image associated with the human head, and determining a radius of a circle centered on the foreground pixel.

7. The method of claim 1, wherein applying the template further comprises matching a pitch and an orientation of the template to a pitch and an orientation of the depth image.

8. A human head detection system, comprising:
    a database means for storing a depth image;
    processing means for applying a template to pixels of the depth image to determine a location of a human head in the depth image, wherein the template includes a circular shaped region and a first annular shaped region surrounding the circular shaped region, the circular shaped region specifying a range of a first plurality of depth values, the first annular shaped region specifying a range of a second plurality of depth values, the second plurality of depth values including depth values larger than the first plurality of depth values, wherein the template specifies a second annular shaped region entirely surrounding the first annular shaped region, the second annular shaped region specifying a third plurality of depth values all having the same depth value,
    wherein the application of the template to pixels of the depth image comprises matching the template to a plurality of foreground pixels in the depth image by comparing depth values of the template to depth values of a neighboring group of pixels surrounding an individual foreground pixel, for the plurality of foreground pixels.

9. The system of claim 8, wherein the first plurality of depth values are based at least in part on a first depth determining model, wherein the second plurality of depth values are based at least in part on a second depth determining model different from the first depth determining model, wherein the third plurality of depth values are based at least in part on a third depth determining model different from the first and second depth determining models, and the third plurality of depth values including depth values larger than the second plurality of depth values.

10. The system of claim 9, wherein the first plurality of depth values are associated only with points in the template lying within the circular shaped region, wherein the second plurality of depth values are associated only with points in the template lying within the first annular shaped region, and wherein the third plurality of depth values are associated only with points in the template lying within the second annular shaped region.

11. The system of claim 9, wherein a radius of the first annular shaped region has a value of 1.25 times a radius of the circular shaped region, and wherein a radius of the second annular shaped region has a value of 1.25 times the value of the radius of the first annular shaped region.

12. The system of claim 11, wherein to compare depth values of the template to depth values of the neighboring group of pixels the processing means is to associate a first group of neighboring pixels of the foreground pixel with the circular shaped region; associate a second group of neighboring pixels of the foreground pixel with the first annular shaped region; compare depth values of the first group of neighboring pixels to depth values of the circular shaped region; and compare depth values of the second group of neighboring pixels to depth values of the first annular shaped region.

13. The system of claim 8, wherein determining the location of the human head in the depth image comprises determining a foreground pixel of the depth image associated with the human head, and determining a radius of a circle centered on the foreground pixel.

14. A device, comprising:
a processor and a memory coupled to the processor, the memory comprising instructions to configure the processor to:
receive a depth image; and
apply a template to pixels of the depth image to determine a location of a human head in the depth image, wherein the template includes a circular shaped region and a first annular shaped region surrounding the circular shaped region, the circular shaped region specifying a range of a first plurality of depth values, the first annular shaped region specifying a range of a second plurality of depth values, the second plurality of depth values including depth values larger than the first plurality of depth values, wherein the template specifies a second annular shaped region entirely surrounding the first annular shaped region, the second annular shaped region specifying a third plurality of depth values all having the same depth value,
wherein the application of the template to pixels of the depth image comprises matching the template to a plurality of foreground pixels in the depth image by comparing depth values of the template to depth values of a neighboring group of pixels surrounding an individual foreground pixel, for the plurality of foreground pixels.

15. The device of claim 14, wherein the first plurality of depth values are based at least in part on a first depth determining model, wherein the second plurality of depth values are based at least in part on a second depth determining model different from the first depth determining model, wherein the third plurality of depth values are based at least in part on a third depth determining model different from the first and second depth determining models, and the third plurality of depth values including depth values larger than the second plurality of depth values.

16. The device of claim 15, wherein a radius of the first annular shaped region has a value of 1.25 times a radius of the circular shaped region, and wherein a radius of the second annular shaped region has a value of 1.25 times the value of the radius of the first annular shaped region.

17. The device of claim 14, wherein to apply the template to pixels of the depth image comprises operations to:
associate a first group of neighboring pixels of a foreground pixel of the depth image with the circular shaped region,
associate a second group of neighboring pixels of the foreground pixel with the first annular shaped region;
compare depth values of the first group of neighboring pixels to depth values of the circular shaped region; and
compare depth values of the second group of neighboring pixels to depth values of the first annular shaped region.

18. An article comprising a non-transitory computer program product having stored therein instructions that, if executed, result in:
receiving a depth image; and
applying a template to pixels of the depth image to determine a location of a human head in the depth image, wherein the template includes a circular shaped region and a first annular shaped region surrounding the circular shaped region, the circular shaped region specifying a range of a first plurality of depth values, the first annular shaped region specifying a range of a second plurality of depth values, the second plurality of depth values including depth values larger than the first plurality of depth values, wherein the template specifies a second annular shaped region entirely surrounding the first annular shaped region, the second annular shaped region specifying a third plurality of depth values all having the same depth value,
wherein the application of the template to pixels of the depth image comprises matching the template to a plurality of foreground pixels in the depth image by comparing depth values of the template to depth values of a neighboring group of pixels surrounding an individual foreground pixel, for the plurality of foreground pixels.

19. The article of claim 18, wherein the first plurality of depth values are based at least in part on a first depth determining model, wherein the second plurality of depth values are based at least in part on a second depth determining model different from the first depth determining model, wherein the third plurality of depth values are based at least in part on a third depth determining model different from the first and second depth determining models, and the third plurality of depth values including depth values larger than the second plurality of depth values.

20. The article of claim 19, wherein a radius of the first annular shaped region has a value of 1.25 times a radius of the circular shaped region, and wherein a radius of the second annular shaped region has a value of 1.25 times the value of the radius of the first annular shaped region.

21. The article of claim 18, wherein the instructions that result in applying the template to pixels of the depth image include instructions that, if executed, result in:
associating a first group of neighboring pixels of a foreground pixel of the depth image with the circular shaped region,
associating a second group of neighboring pixels of the foreground pixel with the first annular shaped region;
comparing depth values of the first group of neighboring pixels to depth values of the circular shaped region; and
comparing depth values of the second group of neighboring pixels to depth values of the first annular shaped region.

22. The article of claim 18, wherein determining the location of the human head in the depth image comprises determining a foreground pixel of the depth image associated with the human head, and determining a radius of a circle centered on the foreground pixel.

* * * * *